United States Patent
Spaulding et al.

(10) Patent No.: US 6,301,393 B1
(45) Date of Patent: Oct. 9, 2001

(54) USING A RESIDUAL IMAGE FORMED FROM A CLIPPED LIMITED COLOR GAMUT DIGITAL IMAGE TO REPRESENT AN EXTENDED COLOR GAMUT DIGITAL IMAGE

(75) Inventors: Kevin E. Spaulding, Spencerport; Rajan L. Joshi, Rochester; Geoffrey J. Woolfe, Penfield, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/489,367

(22) Filed: Jan. 21, 2000

(51) Int. Cl.⁷ ............................... H04N 1/64; G09G 5/06; G06T 11/00; G06T 5/50; G06F 17/30

(52) U.S. Cl. .................. 382/240; 345/431; 345/434; 345/153

(58) Field of Search ................ 382/240; 345/431, 345/434, 153–155

(56) References Cited

U.S. PATENT DOCUMENTS

| | | |
|---|---|---|
| 4,417,270 | 11/1983 | Nagao et al. . |
| 4,903,317 | 2/1990 | Nishihara et al. . |
| 5,050,230 * | 9/1991 | Jones et al. ............... 382/166 |
| 5,122,873 | 6/1992 | Golin . |
| 5,268,754 | 12/1993 | VanDeCapelle et al. . |
| 5,297,219 * | 3/1994 | Weldy ..................... 382/299 |
| 5,317,425 | 5/1994 | Spence et al. . |
| 5,333,069 | 7/1994 | Spence . |
| 5,510,910 | 4/1996 | Bockman et al. . |
| 5,528,377 * | 6/1996 | Hutcheson ................ 358/298 |
| 5,539,540 | 7/1996 | Spaulding et al. . |
| 5,583,665 * | 12/1996 | Gregory, Jr. et al. ........ 358/504 |
| 5,583,666 | 12/1996 | Ellson et al. . |
| 5,666,215 | 9/1997 | Fredlund et al. . |
| 5,713,062 | 1/1998 | Goodman et al. . |
| 5,760,386 | 6/1998 | Ward . |
| 5,892,891 * | 4/1999 | Dalal et al. ............... 358/1.9 |
| 5,949,967 | 9/1999 | Spaulding et al. . |
| 5,990,931 | 11/1999 | Nimri et al. . |
| 6,043,909 * | 3/2000 | Holub .................... 358/504 |

FOREIGN PATENT DOCUMENTS

| | | | |
|---|---|---|---|
| 09-312777 * | 12/1997 | (JP) | H04N/1/60 |
| 11-331622 * | 11/1999 | (JP) | H04N/1/60 |
| WO 99/41734 * | 8/1999 | (WO) | G09G/5/00 |

OTHER PUBLICATIONS

Lindley, Craig A., "JPEG–like Image Compression, part 1: Here's a C++ Class Library for JPEG–like Image Compression", Dr. Dobbs Journal, v. 20, n. 7, pp. 50–59, Jul. 1995.*

(List continued on next page.)

*Primary Examiner*—Mark R. Powell
*Assistant Examiner*—Jeffrey Allen Rossi
(74) *Attorney, Agent, or Firm*—Raymond L. Owens

(57) ABSTRACT

A method for representing a digital image having color values with an extended color gamut in a storage color space having a limited color gamut comprising the steps of: adjusting the color values of the extended color gamut digital image to fit within the limited color gamut to form a limited color gamut digital image; representing the limited color gamut digital image in the storage color space; determining a clipped limited color gamut digital image in which highly quantized regions in the limited color gamut digital image have been clipped; determining a residual image representing a difference between the extended color gamut digital image and the clipped limited color gamut digital image; and associating the residual image with the limited color gamut digital image in the storage color space such that the associated residual image and the limited color gamut digital image in the storage color space are adapted to be used to form a reconstructed extended color gamut digital image.

30 Claims, 7 Drawing Sheets

OTHER PUBLICATIONS

English Language Translation selected passages of Japanese Printed Patent Application No. 11–331622 (Okubo Akihito) of Nov. 30, 1999, as translated by the Japanese Patent Office, pp. 1–9, Nov. 2000.*

English Language Translation of Claim 1 of Japanese Printed Patent Application No. 9–312777 (Kojima Misaki et al.), of Dec. 2, 1997, as translated by the Japanese Patent Office, 1 page, Nov. 2000.*

Abrash, Michael. "Zen of Graphics Programming with Disk", IDG Books Worldwide, as reprinted from Dr DOBBS (TM) Graphics Books on CD–ROM, "Notes Before We Begin", reprinted as page 1, Dec. 1995.*

Stroebel, Leslie et al., ed., "Encyclopaedia of Photography", Boston: Focal Press, ISBN 0–240–80059–1, p. 113, Dec. 1993.*

IEC TC100 sRGB Draft Standard.

R. S. Gentile, E. Walowit, and J. P. Allebach, "A comparison of techniques for color gamut mismatch compensation," J. Imaging Technol. 16, 176–181 (1990).

U.S. application No. 09/162,051, McCarthy et al., filed Sep. 28, 1998.

U.S. application No. 09/162,026, McCarthy et al., filed Sep. 28, 1998.

U.S. application No. 09/162,234, Spaulding et al., filed Sep. 28, 1998.

U.S. application No. 09/162,201, McCarthy et al., filed Sep. 28, 1998.

U.S. application No. 09/162,205, McCarthy et al., filed Sep. 28, 1998.

U.S. application No. 09/354,808, Parada et al., filed Jul. 16, 1999.

U.S. application No. 09/543,652, Spaulding et al., filed Apr. 5, 2000.

U.S. application No. 09/543,038, Spaulding et al., filed Apr. 5, 2000.

U.S. application No. 09/651,510, Spaulding et al., filed Aug. 30, 2000.

U.S. application No. 09/716,107, Spaulding et al., filed Nov. 17, 2000.

* cited by examiner

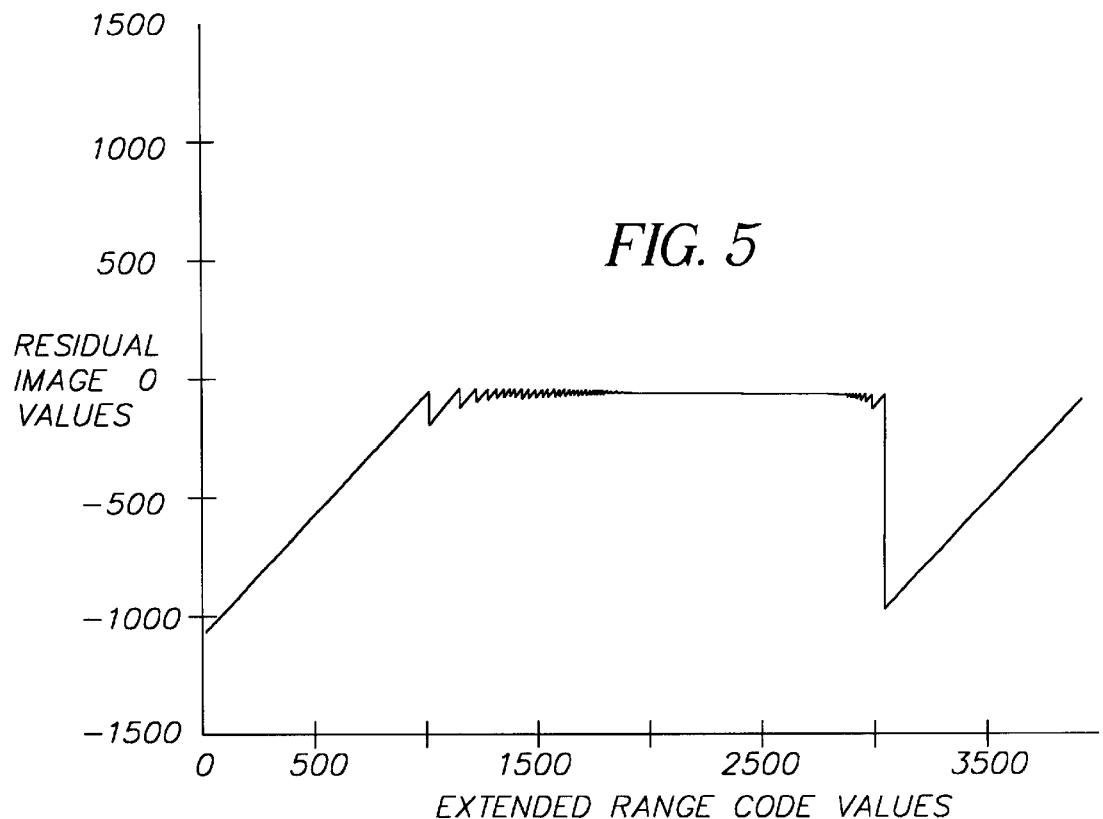
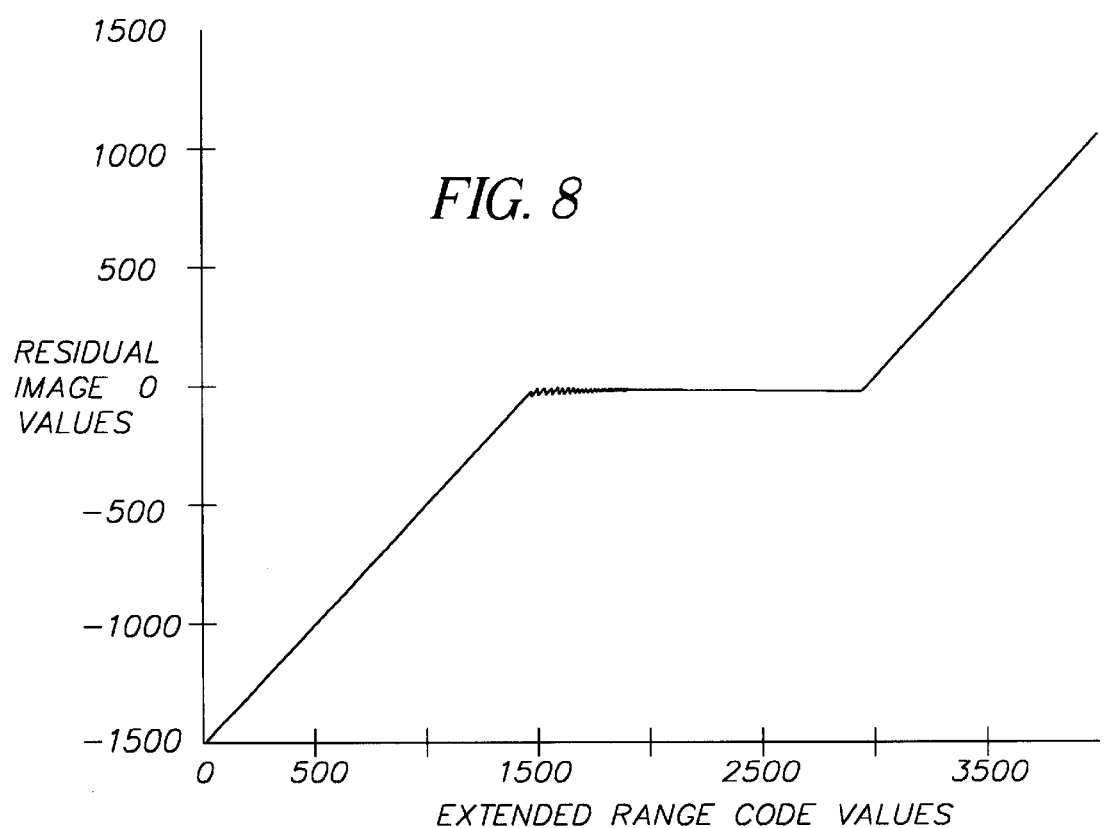

USING A RESIDUAL IMAGE FORMED FROM A CLIPPED LIMITED COLOR GAMUT DIGITAL IMAGE TO REPRESENT AN EXTENDED COLOR GAMUT DIGITAL IMAGE

CROSS REFERENCE TO RELATED APPLICATIONS

The copending applications following are related to the present invention: 09/162,051 filed Sep. 28, 1998; 09/162,234, filed Sep. 28, 1998; 09/543,652, filed Apr. 05, 00; 09/543,038, filed Apr. 05, 00; 09/651,510, filed Aug. 30, 00; and 09/716,107, filed Nov. 17, 00.

Reference is made to commonly assigned U.S. patent application Ser. Nos. 09/162,205 filed Sep. 28, 1998; 09/162,051 filed Sep. 28, 1998; 09/162,026 filed Sep. 28, 1998; 09/162,234 filed Sep. 28, 1998; 09/162,201 filed Sep. 16, 1998; 09/354,808 filed Jul. 16, 1999, the disclosures of which are incorporated herein by reference.

FIELD OF THE INVENTION

The present invention relates to the field of digital imaging, and more particularly to representing an extended color gamut digital image.

BACKGROUND OF THE INVENTION

In digital imaging systems, there are many ways to represent images in digital form. Not only are there many different formats of digital files, but there are also a large variety of different color spaces and color encodings that can be used to specify the color of digital images.

In some cases, the color encoding may be in terms of a so-called device independent color space, such as the well-known CIELAB color space. In recent years this color space has been used extensively to specify the color of digital images in color-managed digital imaging systems. In some cases, the image may actually be stored in the CIELAB color space. More commonly, the color space may be used to connect device profiles, which can be used to describe the color characteristics of various color imaging devices such as scanners, printers, and CRT video displays. The KODAK Photo YCC Color Interchange Space is another example of a device independent color space that can be used to encode digital images.

In other cases, the color-encoding may be in terms of a device dependent color space. Video RGB color spaces and CMYK color spaces are examples of this type. When a color image is encoded in a device dependent color space, it will have the desired color appearance when it is displayed on the particular output device associated with that color space. The advantage of a device dependent color space is that the image is ready to be displayed or printed on the target device. However, the disadvantage is that the image will necessarily be limited to the color gamut of the target device. The color gamut of an imaging device refers to the range of colors and luminance values that can be produced by the device. Therefore, if the target device has a limited dynamic range, or is incapable of reproducing certain saturated colors, then it is not possible to encode color values outside of the range of colors that can be produced on the device.

One type of device dependent color space that has become quite widespread for use as a storage and manipulation color space for digital images is the video RGB color space. In reality, there are many different video RGB color spaces due to the fact that there are many different types of video RGB displays. As a result, a particular set of video RGB color values will correspond to one color on one video display and to another color on another video display. Therefore, video RGB has historically been a somewhat ambiguous color representation due to the fact that the color values could not be properly interpreted unless the characteristics of the target video display were known. Nonetheless, video RGB color spaces have become the defacto standard in many applications because the creation, display and editing of images on video displays are central steps in many digital imaging systems.

Recently, there have been efforts to standardize a particular video RGB color space in order to remove the ambiguity in the interpretation of the color values. (See the proposed IEC TC 100 sRGB Draft Standard). One such proposed standard color space is known as "sRG13." This color space specifies a particular set of red, green, and blue primaries, a particular whitepoint, and a particular non-linear code value to light intensity relationship. Together, these tightly define the overall relationship between the digital code values and the corresponding device independent color values.

Although the use of a standard video RGB color space eliminates much of the ambiguity usually associated with video RGB color spaces, it does nothing to address the fact that this color space has a limited color gamut relative to other output devices. Additionally, any output device will have a limited color gamut relative to that of an original scene. For example, a scene may have a luminance dynamic range of 1000:1 or more, whereas a typical video display or reflection print will have a dynamic range on the order of 100: 1. Certain image capture devices, such as photographic negative film, can actually record dynamic ranges as large as 8000:1. Even though this is larger than the luminance dynamic range associated with most scenes, the extra dynamic range is often useful to provide allowance for exposure errors, light source variations, etc.

In order to encode images from various sources in a video RGB representation, it is necessary to discard information that is outside the color gamut of the video RGB color space. In some cases, such as when it is desired to encode the appearance of colors in an original scene or the colors captured by a photographic negative, a great deal of information will typically need to be discarded due to the large disparity in the dynamic ranges. For the case where it is desired to scan a reflection print and store it in a video RGB color space, it is still necessary to discard a substantial amount of information due to the mismatch in the color gamuts, even though the luminance dynamic ranges may be quite similar.

For example, FIG. 1 shows a comparison of a typical Video RGB Color Gamut 10 and a typical Reflection Print Color Gamut 12. In this case, a*-b* cross-sections of the color gamuts are shown in the CIELAB space at an L* of 65. The colors that are inside the boundary are within the gamuts of the respective devices, while those that are outside the boundary cannot be reproduced, and arc therefore referred to as "out-of-gamut" colors. It can be seen that there is a large set of color values with a b* value larger than 60 that can be produced on the printer but are outside the color gamut of the video display. As a result, if the reflection print were scanned and stored in a video RGB color space, it would not be possible to encode this color information.

The mismatch between the video RGB color gamut and the color gamuts of other output devices and image sources represents a serious limitation on the usefulness of the video RGB color space. However, in many cases, the convenience of storing the image in a color space that is ready for direct display on a computer video CRT has been the over-riding factor in the determination of the preferred color space. This has come at the expense of applications that can utilize the extended color gamut information that may have existed in an input image.

SUMMARY OF THE INVENTION

It is an object of the present invention to overcome the limitations of the prior art by permitting the storage of images in a color space having a limited color gamut, while retaining the extended color gamut information.

It is a further object of the present invention to produce a residual image having reduced serrations, thereby reducing compression artifacts.

These objects are achieved in a method for representing a digital image having color values with an extended color gamut in a storage color space having a limited color gamut comprising the steps of: adjusting the color values of the extended color gamut digital image to fit within the limited color gamut to form a limited color gamut digital image; representing the limited color gamut digital image in the storage color space; determining a clipped limited color gamut digital image in which portions of the limited color gamut digital image have been clipped; determining a residual image representing a difference between the extended color gamut digital image and the clipped limited color gamut digital image; and associating the residual image with the limited color gamut digital image in the storage color space such that the associated residual image and the limited color gamut digital image in the storage color space are adapted to be used to form a reconstructed extended color gamut digital image.

ADVANTAGES

The present invention has the advantage that a digital image can be stored in a color space convenient for a particular application while overcoming the color gamut limitation associated with that color space. The image can be stored, for example, in a video RGB color space that is well-adapted for fast and convenient display on a computer system without compromising the potential quality of the image.

It has the additional advantage that the use of the extended color gamut information is optional. As a result, the benefits of the extended color gamut information can be gained by applications that are able to make use of it, without introducing an image quality or computation penalty for applications that do not require the optional information or that are not able to make use of it.

It has the additional advantage that the use of a clipping function during the process of determining the residual image reduces the serrations in the residual image. thereby causing the residual image to be more compressible. Reconstructed images formed using this arrangement will have reduced compression artifacts.

BRIEF DESCRIPTION OF THE DRAWINGS

FIG. 5 is a plot showing residual image values;

FIG. 8 is a plot showing improved residual image values;

DETAILED DESCRIPTION OF THE INVENTION

Figure 2:
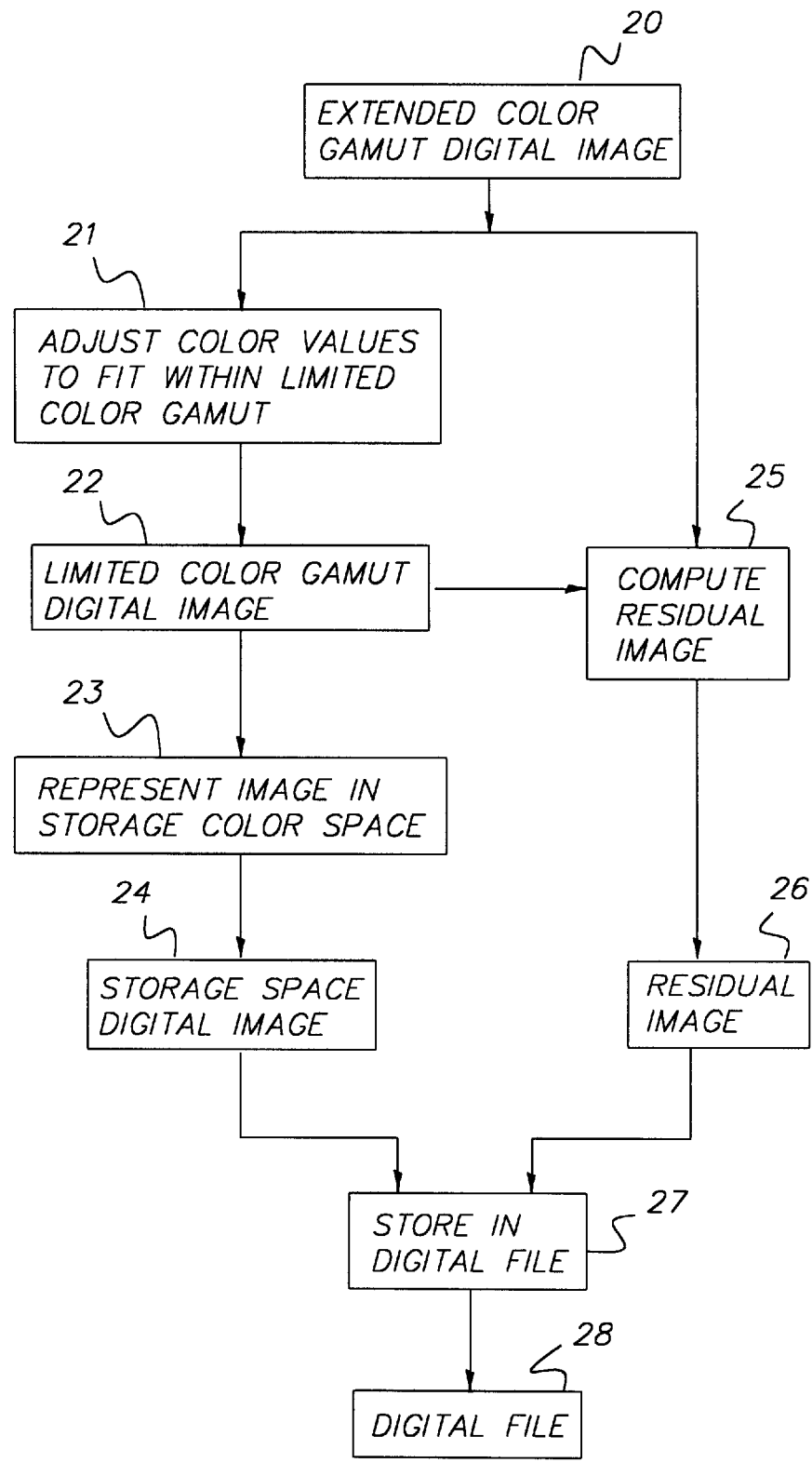
FIG. 2 is a flowchart showing a process for making a limited gamut digital image without clipping.
Figure 6:
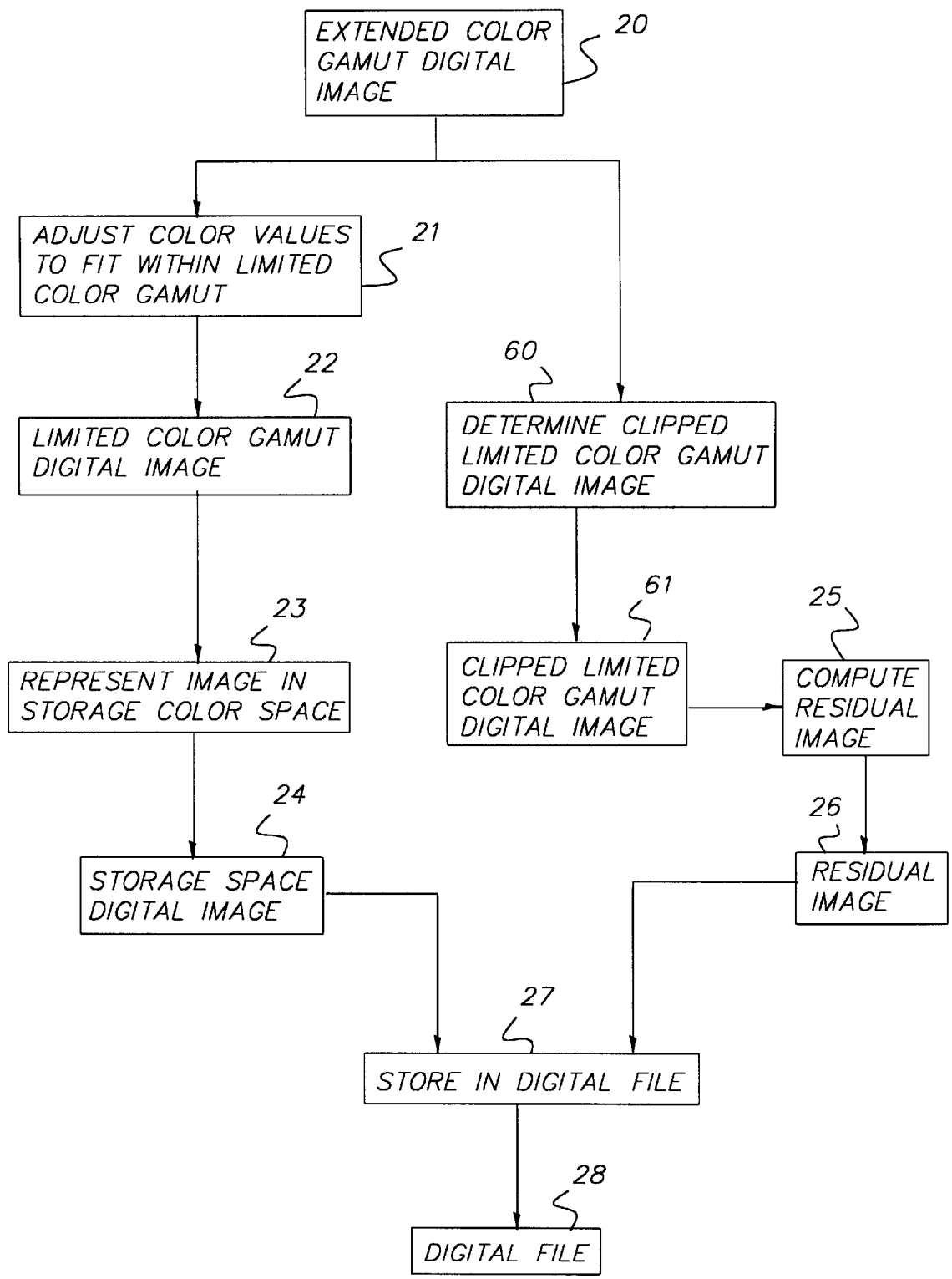
FIG. 6 is a flowchart showing a process for making a limited gamut digital image using a clipping step in accordance with the present invention.

A method for computing a residual image for the purposes of storing, an extended color gamut digital image is shown in FIG. 2, which shows an environment where the present invention can be employed as will be described in FIG. 6 An extended color gamut digital image 20 has color values that are outside the limited color gamut of a storage color space. An adjust color values step 21 is used to limit the color values to those that will fit within the limited color gamut of the storage color space to form a limited color gamut digital image 22. Next, a represent image in storage color space step 23 is used to produce a storage space digital image 24. A compute residual image step 25 is used to determine a residual image 26 representing the difference between the extended color gamut digital image and the limited color gamut digital image. The storage space digital image 24 and the residual image 26 are then stored in a digital file 28 using a digital file storage step 27.

Each of the aspects shown in FIG. 2 will now be discussed in more detail. The extended color gamut digital image 20 can take many different forms. For example, the image can be a scanned photographic print, a scanned photographic negative. a scanned photographic transparency, or an image from a digital camera, etc. Depending on the source of the image, as well as any image processing that has been applied to the image, the image may have very different color gamuts and color representations. Images from scanned photographic negatives and digital cameras can contain scene information having a much larger luminance dynamic range than can be encoded in many storage color spaces. In this case, luminance dynamic range is simply one aspect of color gamut related to the range of luminance values that can be represented.

The color gamut of an imaging system is the range of colors that can be represented or produced. Since color is fundamentally a three-dimensional phenomenon, color gamuts can be viewed as a three-dimensional volume. Color values that are within the volume are said to be "in-gamut," whereas colors that are outside the volume are said to be "out-of-gamut." One aspect of the color gamut is the luminance dynamic range of the system. This is the range of relative luminance values that can be encoded by the system from the whitest white to the blackest black. Another aspect of the color gamut is the range of chroma values that can be represented from a neutral out to a saturated color. The extended color gamut digital image will generally have a larger luminance dynamic range and a larger range of chroma values than the limited color gamut digital image. The range of chroma values that are in-gamut will generally be a function of hue and lightness. Generally, the highest chroma colors can be produced near the hue and lightness of the primary and secondary colors of a given imaging device or color space (usually red, green, blue, cyan, magenta and yellow).

If the image were a scanned photographic print, the color gamut of the image would generally be the color gamut of the original photographic print medium. Likewise if the image were captured by a digital camera, the color gamut of the image would generally be that of an original scene, although it may be limited by the dynamic range of the camera sensor and by lens flare. The color space that the image is represented in is somewhat independent of the color gamut of the original image. For example, the color values for a scanned photographic print can be represented as raw scanner code values. or they can be given by device independent color values according to a color space such as the CIELAB color space. Alternatively, the color values can be expressed in some other color space.

Figure 1:
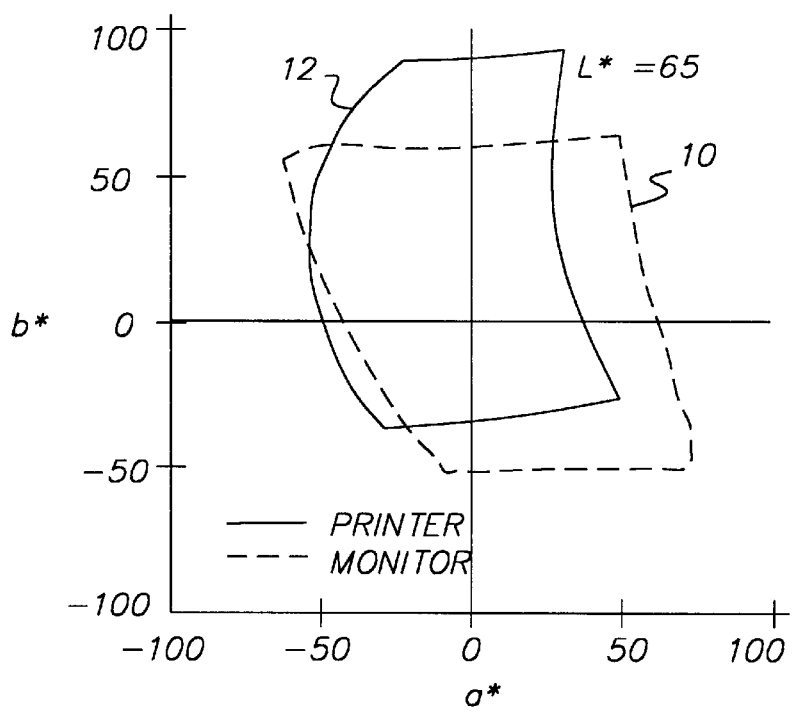
FIG. 1 is a prior art graph comparing the color gamuts of a typical video display, and a typical reflection print.

For many applications, it is convenient to store, display and manipulate the digital image in a particular storage color space that is well-suited for the work flow associated with that application. Frequently, the storage color space that is chosen will be a device dependent color space associated with a common output device or medium used by the system. In many cases, video RGB color spaces are used because they can be displayed or previewed directly on a computer video display without any further processing. Additionally, many software applications that are available to manipulate images on a computer are designed to work with images in a video RGB color space. The color gamut of the storage color space will often be smaller than, or at least different than, the color gamut of the extended color gamut digital image 20. As a result, there generally will be colors in the extended color gamut digital image 20 that can not be represented in the storage color space. For example, consider the case where the extended color gamut digital image 20 is a scanned photographic print. There are many colors within the color gamut of the reflection print that are outside the color gamut of the video RGB color space. This can clearly be seen in FIG. 1 which shows cross-sections through a typical Video RGB Color Gamut 10, and a typical Reflection Print Color Gamut 12.

Therefore, information must be discarded in order to store the reflection print color values in a video RGB color space, or any other limited color gamut storage space. In prior art methods, the information that is discarded is lost permanently and can not be recovered. In the present invention, the information that is lost will be stored in a residual image.

The adjust color values step 21 is used to adjust the color values of the extended color gamut digital image to fit within the limited color gamut of the storage space, forming a limited color gamut digital image 22. In this step, information must be discarded when color values that are outside the limited color gamut are mapped to color values within the limited color gamut. In some cases, the color values for the out-of-gamut colors are simply "clipped," i.e., they are mapped to color values on the surface of the limited color gamut. In other cases, more sophisticated gamut mapping methods can be used to compress the extended color gamut into the limited color gamut without introducing a hard clipping function. For example, the chroma of the input color values can be scaled so that the most saturated colors in the extended color gamut are mapped to the most saturated colors in the limited color gamut. Alternatively, a gamut mapping method can be used that is designed to preserve color appearance as closely as possible. Regardless of what gamut mapping technique is used, there will necessarily be a loss of information and a distortion of the color characteristics of the image.

In many cases, the extended color gamut will contain color values that have higher chroma values than can be represented in the limited color gamut. In some cases, the extended color gamut may also have a larger luminance dynamic range than can be represented in the limited color gamut. In the case where it is necessary to reduce the luminance dynamic range of the image, one part in the implementation of the adjust color values step 21 is typically the application of a tone scale function. The tone scale function might be applied to a luminance channel of the image, or alternatively to each color channel of an RGB color representation. In some applications. the image being processed may actually be a monochrome image, c.g., a black-and-white image. In this case, the tonescale function would be applied to the image luminance values.

For cases where the extended color gamut digital image is a representation of the colors in an original scene, the adjust color values step 21 will typically involve determining reproduced color values that will produce desired aim colors on a target output device. For example, optimal color reproduction aims can be applied to determine desired video RGB aim colors for the original scene colors. The process of transforming the original scene color values into aim reproduced color values is sometimes referred to as "rendering" the image.

Once the limited color gamut digital image 22 has been determined, the next step is to represent it in the storage color space using the represent image in storage color space step 23. The output of this step is a storage space digital image 24. This step typically involves applying a device model, or a color space conversion to determine the storage space color values that correspond to the adjusted color values of the limited color gamut digital image 22. For example, if the adjusted color values were specified in terms of the CIELAB color space, a video display device model can be used to determine the corresponding video RGB values that would be necessary to produce the specified adjusted color values.

A compute residual image step 25 is used to determine a residual image 26 representing the difference between the extended color gamut digital image 20 and the limited color gamut digital image 22. In its simplest form, the residual image can be calculated by simply subtracting the adjusted color values of the limited color gamut digital image 22 from the input color values of the extended color gamut digital image 20. The residual image would then be in terms of the color space used to represent those color values. Alternatively, the color values can be transformed into some other space that would be useful for computing the residual image. For example, it might be desirable to compute the residual image in a color space that is well-suited for compressing the residual image or that is convenient for use in reconstructing the extended color gamut digital image. Generally, the extended color gamut digital image 20 and the limited color gamut digital image 22 should be represented in the same color space before the residual image is calculated so that the in-gamut colors will be given by zero residual errors. Since most images will only have a small fraction of color values that are out of gamut, the residual image will be dominated by zeros and therefore will be highly compressible.

In many cases, the extended color gamut digital image 20 will have a higher precision than the storage space digital image 24. For example, the extended color gamut digital image 20 might be represented using 12-bit digital code values, and the storage space digital image 24 might be represented using 8-bit digital code values. The residual image 26, which is computed by taking a difference relative to the extended color gamut digital image 20 would normally require 12-bits or more to maintain the precision of the extended color gamut digital image 20. However, in many cases, it will be desirable to store the residual image 26 using the same bit-precision as the storage space digital image 24 so that a single compression/storage mechanism can be used. As a result, it may be necessary to convert the higher-precision residual image to a lower-precision level, e.g., 8-bits. This conversion can be accomplished in a number of ways. In a preferred embodiment, the conversion is accomplished using a look-up table which is designed to map the range of residual image values that are expected within a distribution of typical images to the available bit-depth. The look-up table can be used to implement a linear scaling of the residual image values. Alternatively, a nonlinear mapping that has been optimized for a given image can be used.

Once the residual image 26 has been calculated, it should be associated in some fashion with the storage space digital image 24. This can involve storing the residual image 26 in a memory buffer that is associated with a second memory buffer used to store the storage space digital image 24. Alternatively, many applications will store the image data in a digital file 28 on some sort of digital storage media such as a magnetic disk, an optical disk, or a PCMCIA card using a digital file storage step 27. In this case, the storage space digital image 24 and the residual image 26 can be stored in two different files, or can be stored in the same digital image file. In many cases, the file format used to store the storage space digital image 24 may support the use of private image tags. For example, the file formats TIFF, EXIF and FlashPIX all support tags of this sort. These tags are sometimes referred to as meta-data. In cases where file formats of this type are used, it will be convenient to store the residual image data in the form of a residual image tag. In this way, applications that do not know how to make use of the residual image tag will simply ignore it, and will therefore have access only to the storage space digital image 24. Whereas applications that know how to use the residual image tag will be able to make use of it to reconstruct the extended color gamut digital image. Some file formats place a limit on the size of tags, so compression of the residual image is important for these applications.

Figure 3:
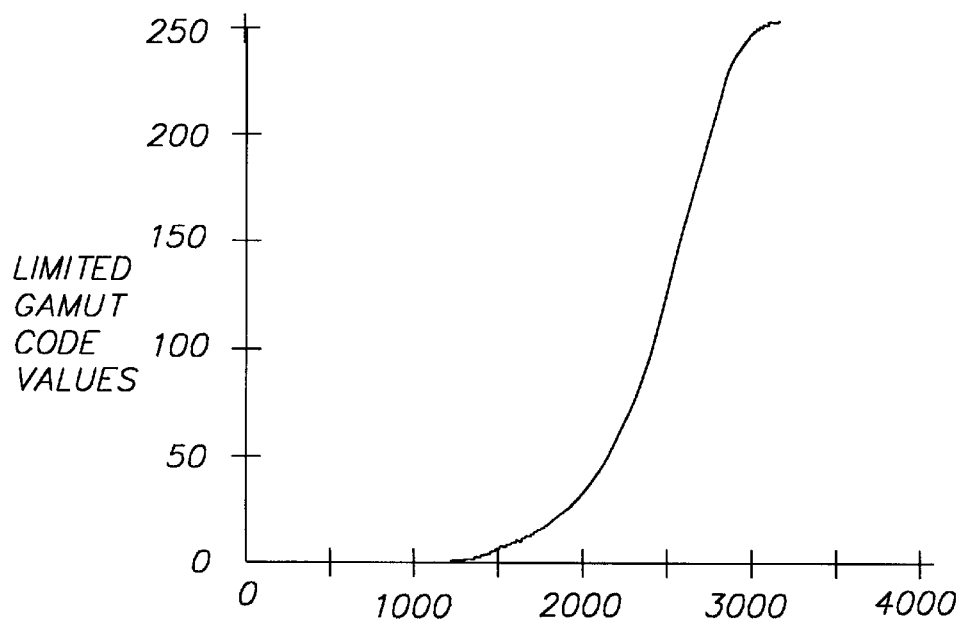
FIG. 3 is a plot of a typical tonescale function.

In many cases, the adjust color values step 21 may result in some portions of the limited color gamut image being highly quantized. For example, if the extended color gamut digital image is a representation of the colors in an original scene, the adjust color values step 21 will typically include a tonescale function that is used to transform original scene color values into reproduced color values. (This is sometimes referred to as "rendering" the image.) An example of a typical tonescale function is shown in FIG. 3. It can be seen that in the low and high scene exposure value regions, the tonescale function has a very low slope. When the resulting limited color gamut digital image is represented in an integer form, significant quantization errors can be introduced in these low slope regions where many input values in the extended color gamut digital image are mapped to a single output value in the limited color gamut digital image.

Figure 4:
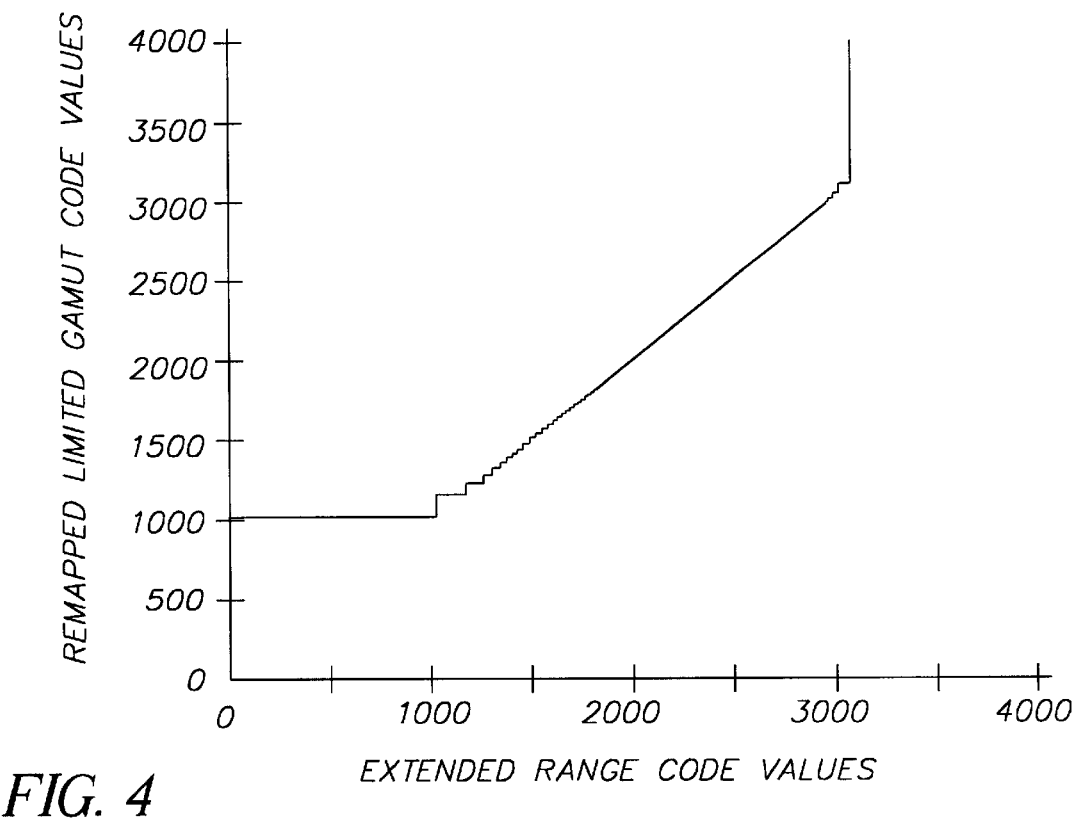
FIG. 4 is a plot showing remapped limited gamut code values.

As discussed above, it is generally desirable to represent the extended color gamut digital image 20 and the limited color gamut digital image 22 in the same color space before the residual image is calculated so that the in-gamut colors will be represented by near-zero residual errors. In many cases, it may be desirable to map the limited color gamut digital image 22 back to the color space of the extended color gamut digital image 20 for the purposes of computing the residual image values. Alternatively, it may be desirable to map both the extended color gamut digital image 20 and the limited color gamut digital image 22 to some other extended dynamic range color space where the residual image can be computed. In either case, it would generally be necessary to remap the limited color gamut digital image 22 through some type of inverse tonescale function to determine a remapped limited color gamut digital image. FIG. 4 shows the results of mapping neutral color values in an extended color gamut digital image 20 through the tonescale function shown in FIG. 3 to obtain the code values for the limited color gamut digital image 22, and then through an inverse tonescale function to obtain remapped limited color gamut code values. It can be seen that the low and high scene exposure value regions of the remapped limited color gamut digital image are highly quantized as a result of the low-slope portions of the tonescale function. FIG. 5 shows the residual image values that would result from taking the difference between the extended color gamut digital image values and the remapped limited color gamut digital image values. It can be seen that the residual image values are in fact near zero for the central portion of the input range where the color values are within the interior of the limited color gamut. However, in the low and high scene exposure value regions, the magnitude of the residual image values gets quite large. Additionally, it can be seen that there are large serrations in the residual image values where a single code value change in the input extended color gamut digital image results in a many code value change in the residual image.

These serrations in the residual image values can cause several complications. First, it will generally be desirable to process the residual image using some type of digital image compression algorithm, such as the standard JPEG compression algorithm, before it is stored. It is well known that images with many sharp transitions and edges do not compress as well as images with slowly varying image content. In this case, even when the input extended dynamic range digital image may be smoothly varying, the residual image can have many sharp transitions corresponding to the serrations. As a result, the residual image may not be very compressible. Additionally. it has been found that any errors introduced by the compression process can result in objectionable artifacts in the portions of the image where the residual image had large serrations.

An important feature of the present invention is a reduction of the large serrations in the residual image, thereby making the residual image better suited for the application of an image compression algorithm. A preferred embodiment of the present invention is shown in FIG. 6. The same reference numbers have been used for elements that are common to both FIG. 2 and FIG. 6. An extended color gamut digital image 20 has color values that are outside the limited color gamut of a storage color space. An adjust color values step 21 is used to limit the color values to those that will fit within the limited color gamut of the storage color space to form a limited color gamut digital image 22. Next, a represent image in storage color space step 23 is used to produce a storage space digital image 24. The limited color gamut digital image 22 is processed by a determine clipped limited color gamut digital image step 60, to form a clipped limited color gamut digital image 61. A compute residual image step 25 is then used to determine a residual image 26 representing the difference between the extended color gamut digital image 20 and the clipped limited color gamut digital image 61. The storage space digital image 24 and the residual image 26 are then stored in a digital file 28 using a digital file storage step 27. The clipped portions of the limited color gamut digital image are the portions of the limited color gamut digital image that have a high level of quantization error.

The improvement relative to the arrangement shown in FIG. 2 is the determine clipped limited color gamut digital image step 60. The purpose of this step is to clip the portions of the limited color gamut digital image 22 that have a high level of quantization error, thereby reducing the large serrations in the residual image. In many cases, this clipping step can be accomplished using a one-dimensional look-up table (1-D LUT) to process the limited color gamut digital image. For example, consider the case that was illustrated in FIG. 3, FIG. 4, and FIG. 5. If a 1-D LUT of the form shown in FIG. 7 were used to modify the remapped limited color gamut code values, the highly quantized shadow and highlight portions of the remapped limited color gamut digital image would be clipped to constant values. (For this illustration, the code values are clipped to be within the range 1500 to 3000.) FIG. 8 shows the residual image values that would result from taking the difference between the extended color gamut digital image values and the clipped remapped limited color gamut digital image values for neutral input extended color gamut digital image values. It can be seen that the large serrations that were present in FIG. 5 have been reduced, and replaced with a smoothly varying signal in the low and high scene exposure value regions. Thus, this will enhance the compressibility of the residual image, and reduce the objectionability of any errors introduced by the compression process.

Figure 7:
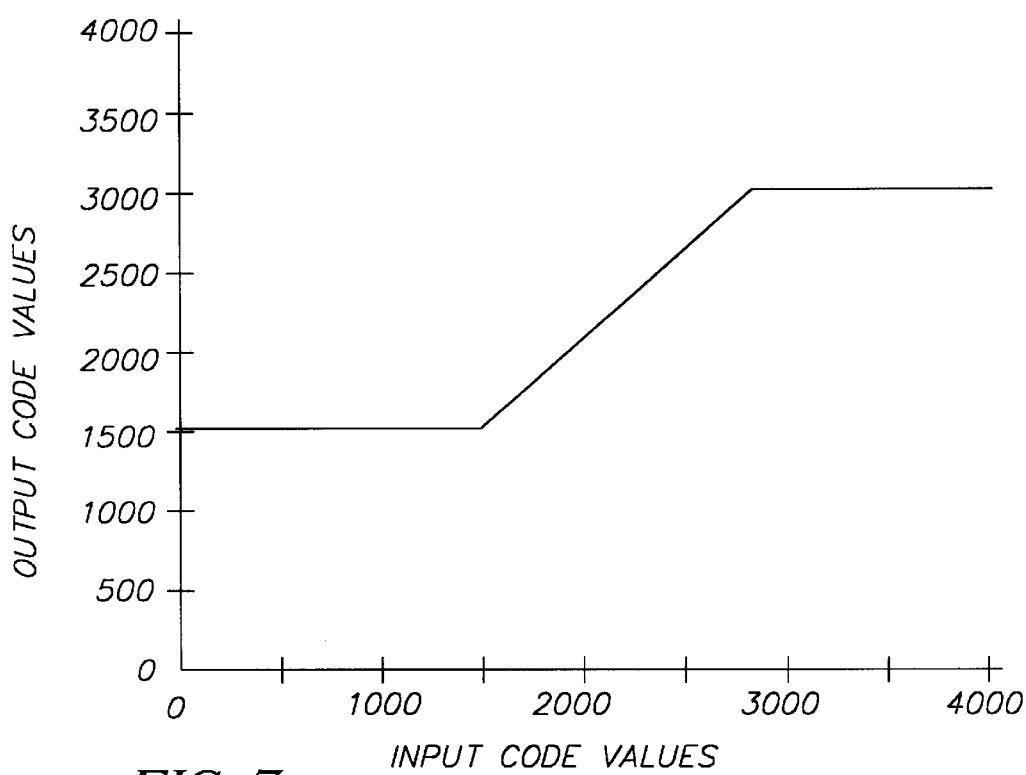
FIG. 7 is a plot of a typical LUT that can be used to modify the remapped limited color gamut code values.

It should be noted that the 1-D LUT of the form shown in FIG. 7 is only one simple example of a clipping function that can be applied for the determine clipped limited color gamut digital image step 60. Many other types of clipping functions can be used as well. For example, a three-dimensional LUT, or some other three-dimensional function, can be used to implement a complex clipping function where certain complex subsets of color values in the color space of the limited color gamut digital image are clipped to eliminate those subsets of color values.

The result of applying the method of the present invention is the creation of both a limited color gamut digital image in a storage color space and an associated residual image which correlates the limited color gamut digital image to an extended color gamut digital image. The use of a determine clipped limited color gamut digital image step 60 provides the added benefit of reducing the amount of serrations that can be formed in the residual image, thereby resulting in a residual image with more desirable characteristics. As discussed previously, the limited color gamut digital image is generally well suited for display on a target output device such as a video display. One advantage of this approach is that systems that cannot make use of the residual image will be able to display and manipulate this image directly with no image quality or computation disadvantage relative to the prior art where only the limited color gamut digital image is stored. However, the information that normally would have been discarded has now been stored in the residual image and is available for use by systems that can utilize it. In this case, the limited color gamut digital image is extracted and the residual image from the digital file is used to form a reconstructed extended color gamut digital image.

Figure 9:
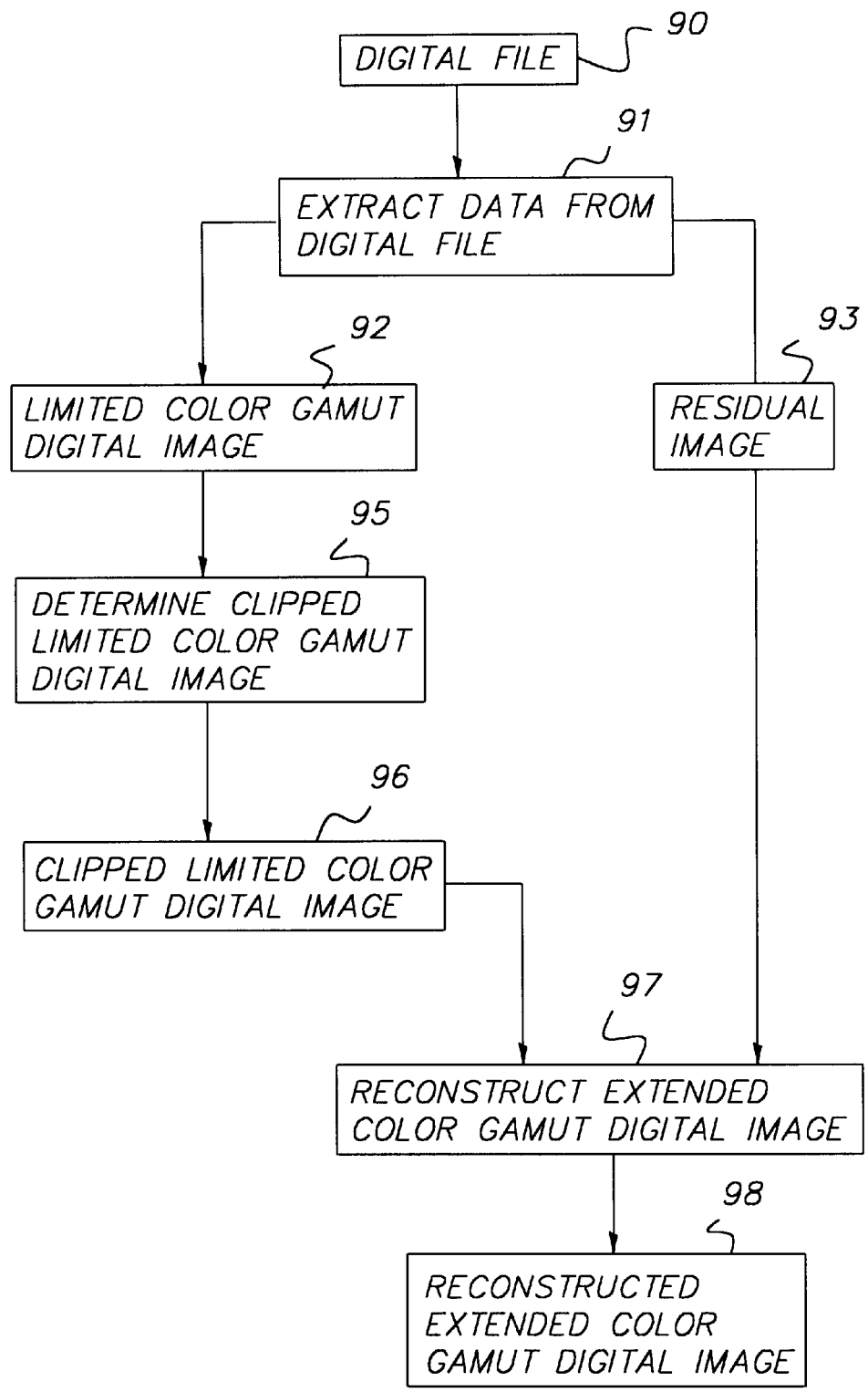
FIG. 9 is a flowchart showing the reconstruction of an extended gamut digital image.

FIG. 9 shows an example of reconstructing an extended color gamut digital image from the limited color gamut digital image and the residual image. The input to this process is an extended color gamut digital file 90 containing a limited color gamut digital image and a residual image created as described above. An extract data from digital file step 91 is used to extract the limited color gamut digital image 92 and the residual image 93. A determine clipped limited color gamut digital image step 95 is then used to determine a clipped limited color gamut digital image 96. This step is identical to step 60 in FIG. 6. A reconstruct extended color gamut digital image step 97 is then used to form a reconstructed extended color gamut digital image 98 by combining the clipped limited color gamut digital image 96 and the residual image 93. Typically the reconstruct extended color gamut digital image step 97 will involve adding together the clipped limited color gamut digital image 96 and the residual image 93. Sometimes it may be desirable to modify one or both of the images using some sort of color space transformation before the adding operation is performed. It may also be desirable to apply a color space transformation after the adding operation is performed.

The reconstructed extended color gamut digital image can be used for many different purposes. For example, it can be used to form a digital image appropriate for display on an output device having a color gamut different from the limited color gamut of the limited color gamut digital image 22 in the digital file 28. This enables the generation of an optimal print from the original extended color gamut digital image, rather than a print limited by constraints of the storage color space.

Alternatively, the information in the reconstructed extended color gamut digital image can be used during the process of applying a modification to the digital image. For example, consider the case where the original image is determined to be over-exposed. In this case, the highlights of the limited color gamut digital image would have been clipped during the adjust color values step 21. However, the highlight information would be restored in the reconstructed extended color gamut digital image 98. This information can then be used to produce a modified digital image that retains the highlight detail. Modifications to the digital image can be interactively specified by a user, such as in the case of a user adjustable lightness knob. Modifications can also be determined by applying an automatic algorithm (without user intervention) to the digital image. For example, a "scene balance algorithm" can be used to estimate the best color balance and lightness level for an image.

In some cases, it will be desirable to send the modified digital image directly to a printer, but in other cases it will be desirable to write the modified image back out to a file. In this case, a new limited color gamut digital image and a new residual image can be calculated to encode the modified image, using the methods described by this invention.

Figure 10:
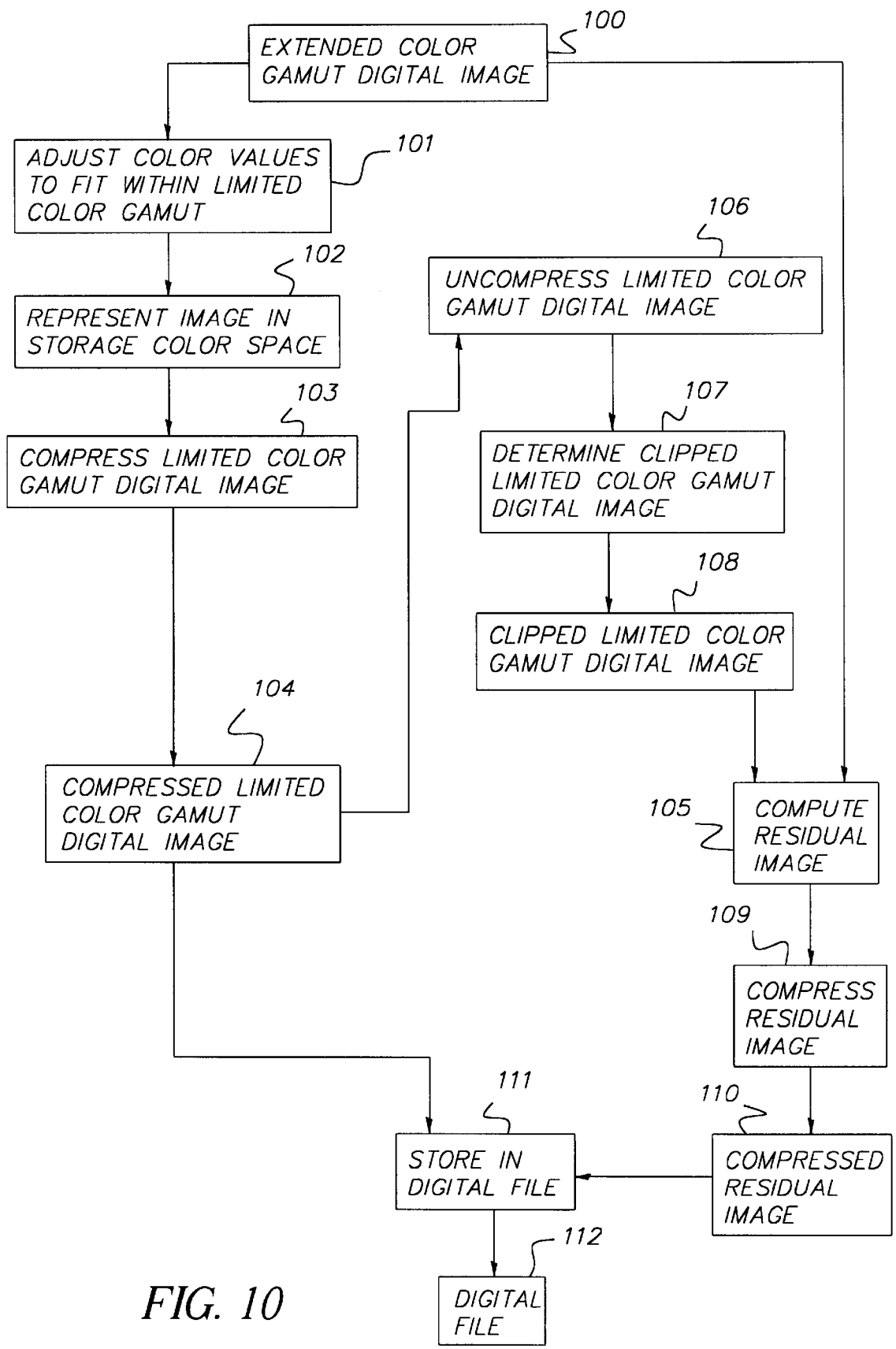
FIG. 10 is a flowchart showing a second process for making a limited gamut digital image in accordance with the present invention.

Another embodiment of the present invention is shown in FIG. 10. As in the previously discussed embodiments, an extended color gamut digital image 100 has color values that are outside the limited color gamut of a storage color space, and an adjust color values step 101 is used to limit the color values to those that will fit within the limited color gamut of the storage color space. Next, a represent image in storage color space step 102 is used to produce a limited color gamut digital image. In this case, the limited color gamut digital image is compressed using a compress limited color gamut digital image step 103 to form a compressed limited color gamut digital image 104. The compress limited color gamut digital image step 103 can be performed using any one of many image data compression methods such as the well-known JPEG compression method which is based on a discrete cosine transform. There are many other types of image data compression methods known to those skilled in the art including those based on differential pulse code modulation, vector quantization, wavelets, or fractals. In some cases, the compression algorithms are lossless, meaning that an exact copy of the original image can be reconstructed from the compressed image. However, in many cases, the compression algorithms are lossy meaning that an image which is reconstructed from the compressed image will only be an approximation of the original image. In these cases, the use of image data compression will introduce errors into the digital image.

The process of computing the residual image in this embodiment of the present invention is slightly modified relative to the previous embodiments. Rather than computing the residual image based on the limited color gamut digital image itself, the residual image is computed from the compressed limited color gamut digital image 104. In this way, the residual image not only includes the differences introduced by representing the image in the limited color gamut, but it also accounts for losses introduced in the compression process. In particular the compute residual image step 105 computes the difference between the extended color gamut digital image 100, and a clipped limited color gamut digital image 108 computed from the compressed limited color gamut digital image by applying an decompress limited color gamut digital image step 106, followed by a determine clipped limited color gamut digital image step 107. It will frequently be desirable to compress the resulting residual image using a compress residual image step 109 to form a compressed residual image 110. The compress residual image step 109 can be performed using many different types of compression methods. In some cases, it can be desirable to compress the residual image using a lossless image data compression method, whereas in other cases, it will be acceptable to use a so-called lossy image data compression method. The compressed limited color gamut digital image 104 and the compressed residual image 110 are then stored in a digital file 112 using a digital file storage step 111.

A computer program product having a computer readable storage medium can have a computer program stored thereon for performing all the steps of the present invention.

The computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

This invention has been described in detail with particular reference to certain preferred embodiments thereof, but it will be understood that variations and modifications can be effected within the spirit and scope of the invention.

PARTS LIST

10 Video RGB Color Gamut
12 Reflection Print Color Gamut
20 extended color gamut digital image
21 adjust color values step
22 limited color gamut digital image
23 represent image in storage color space step
24 storage space digital image
25 compute residual image step
26 residual image
27 digital file storage step
28 digital file
60 determine clipped limited color gamut digital image step
61 clipped limited color gamut digital image
90 extended color gamut digital file
91 extract data from digital file step
92 limited color gamut digital image
93 residual image
95 determine clipped limited color gamut digital image step
96 clipped limited color gamut digital image
97 reconstruct extended color gamut digital image step
98 reconstructed extended color gamut digital image
100 extended color gamut digital image
101 adjust color values step
102 represent image in storage color space step
103 compress limited color gamut digital image step
104 compressed limited color gamut digital image
105 compute residual image step
106 decompress limited color gamut digital image step
107 determine clipped limited color gamut digital image step
108 clipped limited color gamut digital image
109 compress residual image step
110 compressed residual image
111 digital file storage step
112 digital file

What is claimed is:

1. A method for representing a digital image having color values with an extended color gamut in a storage color space having a limited color gamut, comprising the steps of:
   a) adjusting the color values of the extended color gamut digital image to fit within the limited color gamut to form a limited color gamut digital image;
   b) representing the limited color gamut digital image in the storage color space;
   c) determining a clipped limited color gamut digital image in which portions of the limited color gamut digital image have been clipped to eliminate color values where the limited color gamut digital image is highly quantized;
   d) determining a residual image representing a difference between the extended color gamut digital image and the clipped limited color gamut digital image; and
   e) associating the residual image with the limited color gamut digital image in the storage color space such that the associated residual image and the limited color gamut digital image in the storage color space are adapted to be used to form a reconstructed extended color gamut digital image.

2. The method of claim 1 in which the clipped portions of the limited color gamut digital image are the portions of the limited color gamut digital image that have a high level of quantization error thereby reducing large serrations in the residual image.

3. The method of claim 1 where the storage color space is a particular device dependent color space.

4. The method of claim 3 where the storage color space is a video RGB color space.

5. The method of claim 1 where the storage color space is a particular limited color gamut color space.

6. The method of claim 1 where the clipped limited color gamut digital image is determined from the limited color gamut digital image using a look-up table.

7. The method of claim 1 where the extended color gamut digital image has a larger luminance dynamic range than the limited color gamut digital image.

8. The method of claim 7 where the step of adjusting the color values of the extended color gamut digital image to determine the limited color gamut digital image includes applying a tone scale function to reduce the luminance dynamic range of the image.

9. The method of claim 8 where the clipped limited color gamut digital image is determined by clipping portions of the limited color gamut digital image corresponding to low-slope regions of the tone scale function.

10. The method of claim 1 where the limited color gamut digital image in the storage color space is stored in a digital image file using a digital storage medium.

11. The method of claim 10 where the residual image is stored as meta-data in the digital image file.

12. The method of claim 10 where a data compression technique is applied to the residual image before it is stored so that it uses a smaller amount of digital storage memory.

13. The method of claim 10 where the limited color gamut digital image is stored in the digital image file, and the residual image is stored in a separate associated digital image file.

14. The method of claim 1 further including the step of using the residual image together with the limited color gamut digital image in the storage color space to form a reconstructed extended color gamut digital image.

15. The method of claim 1 further including the step of using the residual image together with the limited color gamut digital image in the storage color space to form a digital image appropriate for display on an output device having a color gamut different that the limited color gamut.

16. The method of claim 4 further including the step of previewing the digital image by displaying the limited color gamut digital image in the storage color space on a video display.

17. The method of claim 1 where the extended color gamut digital image originates from a scan of a photographic negative.

18. The method of claim 1 where the extended color gamut digital image originates from a scan of a photographic transparency.

19. The method of claim 1 where the extended color gamut digital image originates from a scan of a photographic print.

20. The method of claim 1 where the extended color gamut digital image originates from a digital camera.

21. The method of claim 1 where the extended color gamut digital image originates from an original piece of artwork.

22. A method for representing and manipulating a digital image with an extended color gamut using a storage color space having a limited color gamut comprising the steps of:
 a) adjusting the color values of the extended color gamut digital image to fit within the limited color gamut to form a limited color gamut digital image;
 b) representing the limited color gamut digital image in the storage color space;
 c) determining a clipped limited color gamut digital image in which portions of the limited color gamut digital image have been clipped to eliminate color values where the limited color gamut digital image is highly quantized;
 d) determining a residual image representing a difference between the extended color gamut digital image and the clipped limited color gamut digital image;
 e) associating the residual image with the limited color gamut digital image in the storage color space such that the associated residual image and the limited color gamut digital image in the storage color space are adapted to be used to form a reconstructed extended color gamut digital image;
 f) specifying a desirable modification to the image; and
 g) using the residual image together with the limited color gamut digital image in the storage color space and the specified desirable modification to the image to produce a modified digital image.

23. The method of claim 22 in which the clipped portions of the limited color gamut digital image are the portions of the limited color gamut digital image that have a high level of quantization error thereby reducing large serrations in the residual image.

24. The method of claim 22 where the desirable modification is interactively user specified.

25. The method of claim 22 where the desirable modification is determined by applying an automatic algorithm to the digital image.

26. A method for representing a digital image having color values with an extended color gamut in a storage color space having a limited color gamut comprising the steps of:
 a) adjusting the color values of the extended color gamut digital image to fit within the limited color gamut to form a limited color gamut digital image;
 b) representing the limited color gamut digital image in the storage color space;
 c) compressing the limited color gamut digital image in the storage color space:
 d) decompressing the limited color gamut digital image in the storage color space to form an decompressed limited color gamut digital image;
 e) determining a clipped limited color gamut digital image in which portions of the decompressed limited color gamut digital image have been clipped to eliminate color values where the limited color gamut digital image is highly quantized;
 f) determining a residual image representing a difference between the extended color gamut digital image and the clipped limited color gamut digital image; and
 g) associating the residual image with the compressed limited color gamut digital image in the storage color space such that the associated residual image and the compressed limited color gamut digital image in the storage color space are adapted to be used to form a reconstructed extended color gamut digital image.

27. The method of claim 26 in which the clipped portions of the limited color gamut digital image are the portions of the limited color gamut digital image that have a high level of quantization error thereby reducing large serrations in the residual image.

28. A computer program product, comprising a computer readable storage medium, for representing a digital image having color values with an extended color gamut in a storage color space having a limited color gamut having a computer program stored thereon for performing the steps of:
 a) adjusting the color values of the extended color gamut digital image to fit within the limited color gamut to form a limited color gamut digital image;
 b) representing the limited color gamut digital image in the storage color space;
 c) determining a clipped limited color gamut digital image in which portions of the limited color gamut digital image have been clipped to eliminate color values where the limited color gamut digital image is highly quantized;

d) determining a residual image representing a difference between the extended color gamut digital image and the clipped limited color gamut digital image; and e) associating the residual image with the limited color gamut digital image in the storage color space such that the associated residual image and the limited color gamut digital image in the storage color space are adapted to be used to form a reconstructed extended color gamut digital image.

29. A computer program product for representing and manipulating a digital image with an extended color gamut using a storage color space having a limited color gamut, and having a computer readable storage medium with a computer program stored thereon for performing the steps:

a) adjusting the color values of the extended color gamut digital image to fit within the limited color gamut to form a limited color gamut digital image;

b) representing the limited color gamut digital image in the storage color space;

c) determining a clipped limited color gamut digital image in which portions of the limited color gamut digital image have been clipped to eliminate color values where the limited color gamut digital image is highly quantized;

d) determining a residual image representing a difference between the extended color gamut digital image and the clipped limited color gamut digital image;

e) associating the residual image with the limited color gamut digital image in the storage color space such that the associated residual image and the limited color gamut digital image in the storage color space are adapted to be used to form a reconstructed extended color gamut digital image;

f) specifying a desirable modification to the image; and g) using the residual image together with the limited color gamut digital image in the storage color space and the specified desirable modification to the image to produce a modified digital image.

30. A computer program product, comprising a computer readable storage medium, for representing a digital image having color values with an extended color gamut in a storage color space having a limited color gamut having a computer program stored thereon for performing the steps of:

a) adjusting the color values of the extended color gamut digital image to fit within the limited color gamut to form a limited color gamut digital image;

b) representing the limited color gamut digital image in the storage color space;

c) compressing the limited color gamut digital image in the storage color space;

d) decompressing the limited color gamut digital image in the storage color space to form an decompressed limited color gamut digital image;

e) determining a clipped limited color gamut digital image in which portions of the decompressed limited color gamut digital image have been clipped to eliminate color values where the limited color gamut digital image is highly quantized;

f) determining a residual image representing a difference between the extended color gamut digital image and the clipped limited color gamut digital image; and g) associating the residual image with the compressed limited color gamut digital image in the storage color space such that the associated residual image and the compressed limited color gamut digital image in the storage color space are adapted to be used to form a reconstructed extended color gamut digital image.

\* \* \* \* \*